(12) United States Patent
Veluswamy et al.

(10) Patent No.: US 10,458,447 B2
(45) Date of Patent: Oct. 29, 2019

(54) SYSTEM FOR IMPROVING THE FLUID CIRCULATION IN A FLUID-BODY

(71) Applicant: Reliance Industries Limited, Maharashtra (IN)

(72) Inventors: Ganesh Kumar Veluswamy, Tamil Nadu (IN); Avinash Ramchandra Khopkar, Maharashtra (IN)

(73) Assignee: RELIANCE INDUSTRIES LIMITED, Mumbai, Maharashtra (IN)

(*) Notice: Subject to any disclaimer, the term of this patent is extended or adjusted under 35 U.S.C. 154(b) by 121 days.

(21) Appl. No.: 15/032,403

(22) PCT Filed: Oct. 21, 2014

(86) PCT No.: PCT/IN2014/000671
§ 371 (c)(1),
(2) Date: Apr. 27, 2016

(87) PCT Pub. No.: WO2015/075739
PCT Pub. Date: May 28, 2015

(65) Prior Publication Data
US 2016/0258454 A1 Sep. 8, 2016

(30) Foreign Application Priority Data
Nov. 1, 2013 (IN) .......................... 3483/MUM/2013

(51) Int. Cl.
*F15D 1/00* (2006.01)
*A01G 33/00* (2006.01)
*E03F 11/00* (2006.01)

(52) U.S. Cl.
CPC ........... *F15D 1/0025* (2013.01); *A01G 33/00* (2013.01); *E03F 11/00* (2013.01)

(58) Field of Classification Search
CPC .............................. F15D 1/0025; A01G 33/00
See application file for complete search history.

(56) References Cited

U.S. PATENT DOCUMENTS

| | | |
|---|---|---|
| 2,340,166 A | 1/1944 | Young et al. |
| 4,095,092 A * | 6/1978 | Neff .......................... B07C 5/12 |
| | | 119/216 |
| 4,217,728 A | 8/1980 | Shimamatsu et al. |
| | | (Continued) |

OTHER PUBLICATIONS

International Search Report and Written Opinion for International Application No. PCT/IN2014/000671, dated Jul. 27, 2015, 8 pages.

*Primary Examiner* — Jessica Cahill
*Assistant Examiner* — Angelisa L. Hicks
(74) *Attorney, Agent, or Firm* — Westman, Champlin & Koehler, P.A.

(57) ABSTRACT

The present disclosure relates to a system for improving fluid circulation in a fluid-body with improved hydrodynamics, minimized dead zones and a system with minimized energy losses, the system comprises at least one dividing-element disposed within the fluid-body, wherein, the dividing-elements divides the fluid-body into at least two segments such that the segments are connected to and in fluid communication with each other, characterized in that, at least one of the dividing-element has at least one asymmetrical structure configured on at least one extremity thereof.

19 Claims, 6 Drawing Sheets

(56) References Cited

U.S. PATENT DOCUMENTS

| | | | |
|---|---|---|---|
| 5,755,966 A * | 5/1998 | Mackrle | C02F 3/02 |
| | | | 210/194 |
| 6,795,312 B2 | 9/2004 | Narakino et al. | |
| 7,374,672 B2 | 5/2008 | Hofmann | |
| 8,642,326 B1 * | 2/2014 | Schaefer | A01G 33/00 |
| | | | 435/257.1 |
| 2012/0117869 A1 * | 5/2012 | Javan | A01G 33/00 |
| | | | 47/60 |
| 2012/0252104 A1 * | 10/2012 | Waibel | C12M 21/02 |
| | | | 435/257.1 |
| 2012/0272574 A1 | 11/2012 | Parsheh et al. | |
| 2013/0269244 A1 * | 10/2013 | Jovine | A01G 33/00 |
| | | | 47/1.4 |

\* cited by examiner

SYSTEM FOR IMPROVING THE FLUID CIRCULATION IN A FLUID-BODY

CROSS-REFERENCE TO RELATED APPLICATION

This Application is a Section 371 National Stage Application of International Application No. PCT/IN2014/000671, filed 21 Oct. 2014 and published as WO 2015/075739 A2 on 28 May 2015, in English, the contents of which are hereby incorporated by reference in their entirety.

FIELD OF DISCLOSURE

The present disclosure relates to a system for improving fluid circulation in a fluid-body and particularly to a system for improving fluid circulation in a fluid-body, wherein the fluid-body is a pond with improved hydrodynamics, minimized dead zones & a system with minimized energy losses.

BACKGROUND

Generally a raceway pond is a shallow artificial pond used in growth of microorganisms like algae. The Raceway pond can be of two types open ponds and closed ponds. The raceway ponds have been used for different types of industrial requirements. The raceway pond consists of many rectangular grids connected to and in fluid communication with each other and each rectangular grid consists of one channel in an oval shape to form automotive raceway circuit. Also, each rectangular grid of raceway pond consists of a dividing element that turns the flow of fluid by 180° therewithin. The raceway pond may consists of a pumping mechanism such as paddle wheel in the rectangular grids to induce the flow movement required for various purposes such as waste water treatment, microorganism growth such as bacteria, algae, and for mixing of ingredients such as chemical ingredients.

Typically, the velocity of the fluid in the raceway pond is about 10-40 cm/s and the depth of the fluid in the raceway pond is about 15-30 cm. The bends of the dividing-element forms hairpin like structure or dumbbell like structure. Basically, while the raceway pond is in operation, the fluid flowing takes 180° turn near the bends of each dividing-element and this leads to boundary layer separation at the extremities of the dividing-element leading to the recirculation of fluid and fluid velocity stratification. This, in turn, leads to the formation of dead zones in the immediate vicinity of the bends. The dead zones result in an increase in the population of unwanted microorganisms such as grazers that leads to frequent crashing of the raceway pond, which may be caused due to inefficient mixing. In comparing the energy efficiency of different high rate algal raceway pond designs using computational fluid dynamics, Chemical Engineering Research and Design, 2012, Liffman et al proposes a number of 3-D bend geometric s that deflect the flow to the outer edge of the bend and retain a channel cross-sectional area, thereby minimizing energy losses due to centrifugal forces. Numerical modeling was used to model bend configurations. Some of the new bend designs such as "narrow", "medium", "wide" box designs not only minimizes energy consumption but also improves the mixing of the raceway pond by removing low speed and stagnation regions within the flow. Specifically, Liffman et al discloses a cultivation pond with symmetrical tear-drop profile on both sides of the dividing-element of each rectangular grid for improving the fluid flow profile.

However, the symmetrical tear-drop profile on both the sides of the dividing-element reduces the area available for the growth of microorganisms, thereby increasing the pressure drop and hence such system as disclosed by Liffman et al consumes more power.

Further, United States Patent Application US20120272574 discloses algae cultivation ponds having a contraction zone, an expansion zone, and vanes within the expansion zone of the cultivation pond. This patent application discloses the cultivation pond having the bend at any one of the extremity of the dividing-element that forms the tear-drop profile at any one side of the extremity of the dividing-element.

However, from the prior art, it is observed that the way the bend of the dividing-element is configured at the extremities of the dividing-element of the raceway, inevitably leads to one or more disadvantages:

One disadvantage of the conventional system is that it fails to provide a system with minimized dead zones and velocity stratification around the bend regions of the system.

Another disadvantage of the conventional system is that it does not eliminate local recirculation of the fluid flowing within the system and prohibiting for flow separation.

Still another disadvantage of the conventional system is that it does not provide a system with minimal energy losses associated with the fluid flow at the bends within the system.

Yet another disadvantage of the conventional system is that it does not provide a system with minimal power requirement for fluid flow.

Yet another disadvantage of the conventional system is that it does not provide a system with minimal loss of operational area.

Further another disadvantage of the conventional system is that it does not provide a system with improved hydrodynamic behavior.

Hence, in order to obviate the above mentioned problems associated with the conventional system for the growth of microorganisms, it is necessary to re-design the bend configured at one of the extremity of the dividing-element of the raceway pond for improving fluid circulation in a fluid-body.

Objects

Some of the objects of the present disclosure aimed to ameliorate one or more problems of the prior art or to at least provide a useful alternative are listed herein below.

It is an object of the present disclosure to eliminate drawbacks associated with conventional system for improving fluid circulation in a fluid-body that fail to provide a system with minimized dead zones and velocity stratification around the bend regions of the system.

Another object of the present disclosure is to provide a system which eliminates local recirculation of the fluid flowing within the system and prohibiting for flow separation.

Yet another object of the present disclosure is to provide a system with minimal energy losses associated with the fluid flow at the bends within the system.

Still another object of the present disclosure is to provide a system with minimal power requirement for fluid flow.

Further object of the present disclosure is to provide a system with minimal loss of operational area.

Yet another object of the present disclosure is to provide a system with improved hydrodynamic behavior.

The other objects and advantages of the present disclosure will be more apparent from the following description when read in conjunction with the accompanying figures, which are not intended to limit the scope of the present disclosure.

SUMMARY

A system for improving fluid circulation in a fluid-body is disclosed in accordance with an embodiment of the present disclosure. The system comprising, at least one dividing-element disposed within said fluid-body, wherein, the dividing-elements divides the fluid-body into at least two segments such that the segments are connected to and in fluid communication with each other, characterized in that, at least one of the dividing-element has at least one asymmetrical structure configured on at least one extremity thereof.

According to one embodiment the asymmetrical structure of the system comprising a leading tapered side wall connected to a first operative horizontal surface parallel to the dividing-element, a first curved surface forming an extension of said the operative horizontal surface, a second curved surface forming an extension of the first curved surface and connected to the second operative horizontal surface parallel to the dividing-element, and a trailing tapered side wall is an extension of the second operative horizontal surface and the trailing tapered side walls is connected to the dividing element.

Typically, the leading tapered side wall, the first operative horizontal surface, the first curved surface, the second curved surface, the trailing tapered side wall, forms a continuous asymmetrical structure of the system.

According to another embodiment the leading tapered side wall is inclined at a leading angle "θ" to a longitudinal axis of the dividing-element and the trailing tapered side wall is inclined at a trailing angle "φ" to the longitudinal axis of the dividing-element.

Typically, the leading angle "θ" is less than the trailing angle "φ".

Typically, the inception of the leading tapered side wall is closer to one of the extremities of the dividing element, and the inception of the trailing tapered side wall is distant to one of the extremities of the dividing element, such that the inception points of the leading tapered side wall and the tapered side wall are different or not coincident.

According to another embodiment, the dividing-element has a structure that is at least one structure chosen from a group consisting of: a hollow structure, a solid structure, a hollow structure filled with a fluid, a perforated solid structure, a perforated hollow structure, a semi-solid structure and a combination thereof.

Typically, the dividing-element is made up materials chosen from a group consisting of masonry, clay, plastic, wood, metal and fibrous material.

Typically, the asymmetrical structure is secured at one of the extremities of the dividing-element.

Alternatively, the asymmetrical structure is removably attached at one of the extremities of the dividing-element.

Further, the asymmetrical structure has a shape chosen from a group consisting of an irregular hairpin and irregular dumbbell.

Also, the dividing-element and the asymmetrical structures are inflatable and are made of an elastic material.

Typically, the dividing-element and the asymmetrical structures are inflated with one or more fluids and mixtures thereof.

According to another embodiment, a pumping mechanism is provided in the fluid body that creates at least one of, clockwise circulation and anticlockwise circulation within segments of the fluid-body.

Typically, the pumping mechanism for circulating the fluid within the fluid-body is at least one like a paddle wheel, a propeller, a linear jet.

Further, the fluid circulation in at least two segments is from first segment to last segment and from last segment to first segment through intermediate segments.

Furthermore, the configuration and flow of the fluid in the fluid body is such that it first comes in contact with the leading tapered side wall and then it comes in contact with the trailing tapered side wall forming an asymmetric fluid profile.

BRIEF DESCRIPTION OF THE ACCOMPANYING FIGURES

A system for improving fluid circulation in a fluid-body of the present disclosure will now be described with the help of accompanying drawings, in which.

DETAILED DESCRIPTION

A system for improving the fluid circulation in a fluid-body of the present disclosure will now be described with reference to embodiments which do not limit the scope and ambit of the disclosure.

The embodiments herein, the various features and the advantageous details thereof are explained with reference to the non-limiting embodiments in the following description. Descriptions of well-known components and processing techniques are omitted so that there is no unnecessarily confusion about the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description hereinafter, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Conventional systems are associated with various drawbacks, which include formation of local recirculation regions and velocity stratification inherently occurring near the 180° bends within the pond. Such a phenomenon results in an increase in population of grazers in ponds leading to frequent pond crashes. In addition, velocity stratification at 180° bends leads to higher energy loss, and therefore, brings about a subsequent increase in consumption of power for the flow of fluid in the pond.

Various embodiments of the present are explained herein below with reference to FIG. 1, FIG. 2, FIG. 3, and FIG. 4, wherein the key components are referenced generally by numerals as indicated in the accompanying drawings. In accordance with the present disclosure, the system includes at least one dividing-element and at least one asymmetrical structure at the extremities of the dividing-element. The structure is asymmetrical about the longitudinal axis of the dividing-element and disposed on at least one of the extremities of the dividing-element. The system with aforementioned configuration will eliminate the local recirculation regions and velocity stratification neat the extremities of the system.

Figure 1:
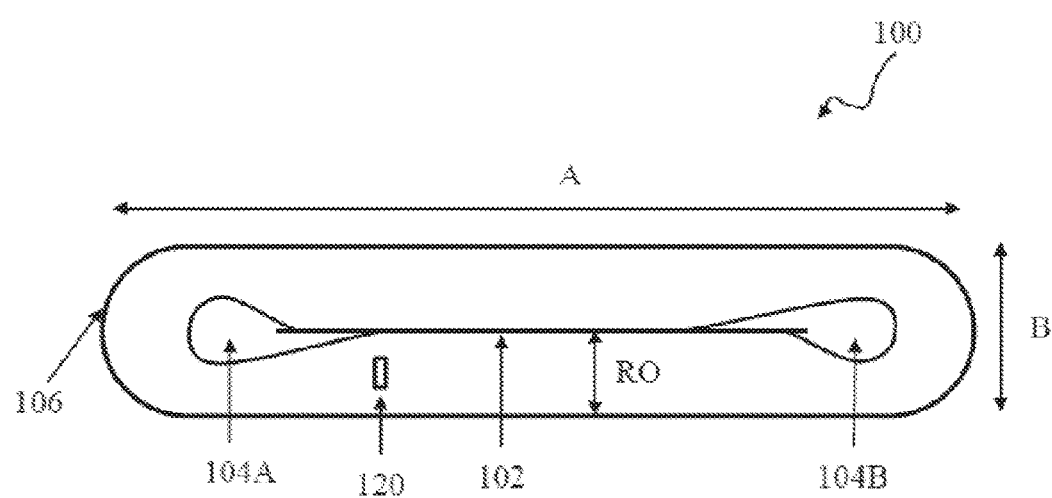
FIG. 1 illustrates a schematic top view of the system in accordance with an embodiment of the present disclosure.

FIG. 1 illustrates one embodiment for improving the fluid circulation in a fluid-body for the growth of micro-organisms such as bacteria, fungi, and algae. In accordance with this embodiment, the system (100) is used for algae cultivation. The system 100 comprising a dividing-element (102), at least one asymmetrical structure (104A and 104B) disposed at the extremities of the dividing-element (102), and a boundary wall (106). The boundary wall (106) is curved or rounded at the extremities of the rectangular cylinder such that it forms a continuous rectangular cylinder. Further, the dividing-element (102) has a width of about 30 cm. The boundary wall (106) is joined to two longitudinal side portions and forms the closure to the dividing-element (102) and asymmetrical structures (104A and 104B). The dividing-element (102) is placed at some distance from the boundary wall (106) and defines a fluid flow channel between each longitudinal side portion and dividing-element (102). The asymmetrical structures (104A and 104B) around the longitudinal axis of the dividing-element (102) are located at the extremities of the dividing-element (102).

Further, the longitudinal length of the boundary wall (106) is "A" and breadth of the boundary is "B", wherein "A" is greater than "B".

Furthermore, longitudinal length of "A" is in the range of from 140 meters to 400 meters, and breadth "B" in the range of from 14 meters to 25 meters. In accordance with this embodiment of the present disclosure, depending upon the longitudinal length "A" and breadth "B" the length of the dividing-element (102) may vary in the range of from 126 meters to 375 meters.

According to this embodiment of the present disclosure, the system (100) comprises at least one pumping mechanism (120) wherein a pumping mechanism (120) is at least one like a paddle wheel, a propeller, provided in the fluid body that creates at least one of, clockwise circulation and anticlockwise circulation within segments of the fluid-body. The circulation of the fluid in the fluid body is induced by the continuous transfer of the momentum from the pumping mechanism (120). According to this embodiment; the circulation of the fluid in the flow channel may be either in, clockwise direction or anticlockwise direction around the dividing-element (102) and at least one of the asymmetrical structures (104A and 104B).

Figure 2:
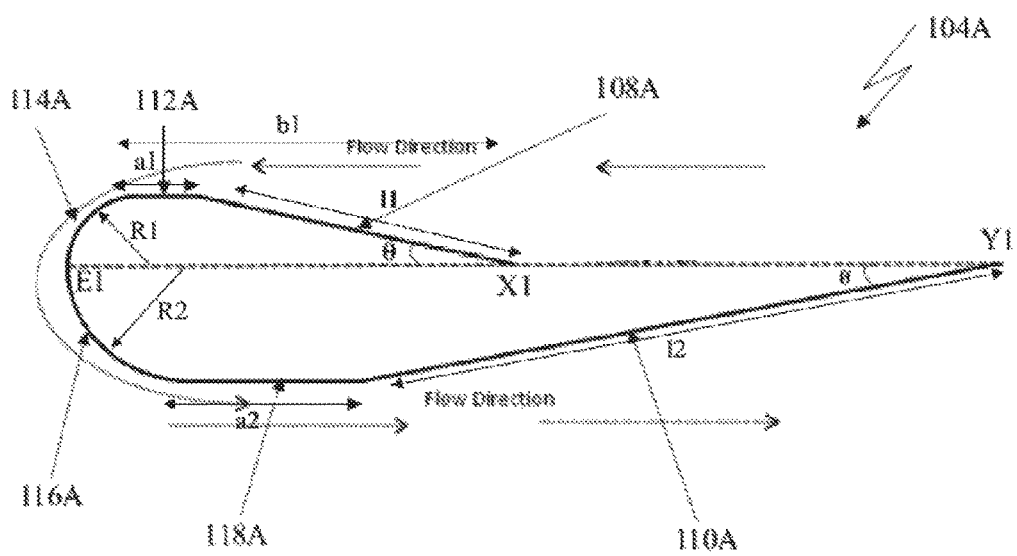
FIG. 2 illustrates a schematic view of an asymmetrical structure of FIG. 1.

In accordance with another embodiment of the present disclosure, FIG. 2 illustrates one of the asymmetrical structure (104A) of the system 100, wherein the asymmetrical structure (104A) comprising of a leading tapered side wall (108A) connected to a first operative horizontal surface (112A) parallel to the dividing-element (102), a first curved surface (114A) forming an extension of the first operative horizontal surface (112A), a second curved surface (116A) forming an extension of the first curved surface (114A) and connected to the second operative horizontal surface (118A) parallel to the dividing-element (102), a trailing tapered side wall (110A) is an extension of the second operative horizontal surface (118A) and the trailing tapered side wall (110A) is connected to the dividing element (102). The leading tapered side wall (108A) is inclined at a leading angle "θ" to a longitudinal axis of the dividing-element (102) and the trailing tapered side wall (110A) is inclined at a trailing angle "φ" to the longitudinal axis of the dividing-element (102) such that the leading angle "θ" is less than the trailing angle "φ".

Moreover, the leading tapered side wall (108A), the first operative horizontal surface (112A), the first curved surface (114A), the second curved surface (116A), the second operative horizontal surface (118A), the trailing tapered side wall (110A), forms a continuous asymmetrical structure (104A).

Further, the inception (X1) of one of the leading tapered side wall (108A) is closer to one of the extremities of the dividing element (102) and the inception (Y1) of one of the trailing tapered side wall (110A) is distant to one of the extremities of the dividing element (102) such that the distance of the inception point (Y1) is twice the distance of the inception point (X1) from one of the extremities (E1) on the dividing-element (102).

Figure 3:
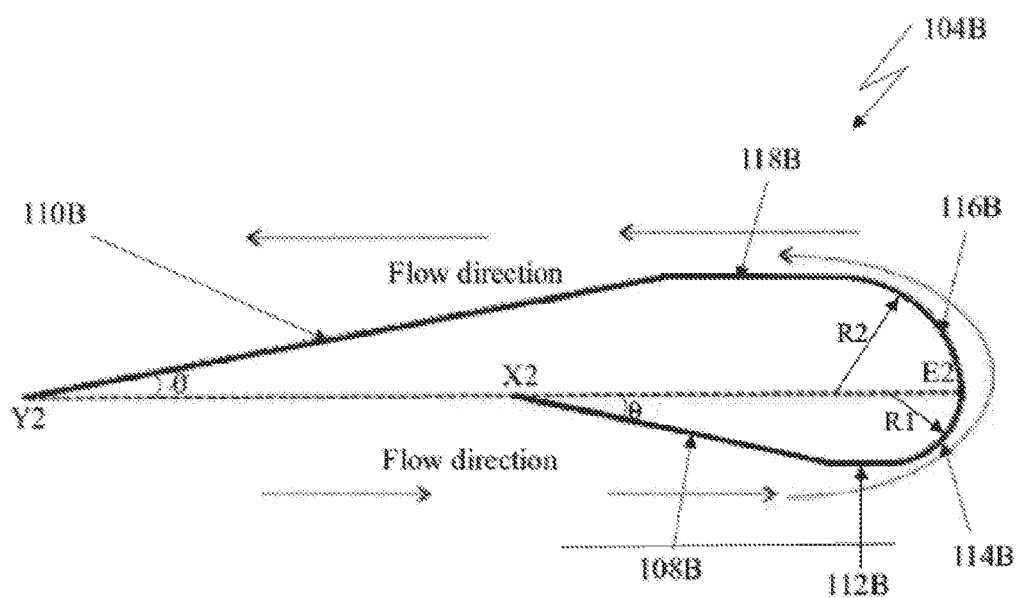
FIG. 3 illustrates a schematic view of another asymmetrical structure of FIG. 1.

FIG. 3 illustrates the another embodiment of the system (100), according to the another embodiment, the system (100) comprising of at least one of the asymmetrical structure (104B) which comprises of a leading tapered side wall (108B) connected to a first operative horizontal surface (112B) parallel to the dividing-element (102), a first curved surface (114B) forming an extension of the first operative horizontal surface (112B), a second curved surface (116B) forming an extension of the first curved surface (114B) and connected to the second operative horizontal surface (118B) parallel to the dividing-element (102), a trailing tapered side wall (110B) is an extension of the second operative horizontal surface (118B) and the trailing tapered side wall (110B) is connected to the dividing element (102). The leading tapered side wall (108B) is inclined at a leading angle "θ" to a longitudinal axis of the dividing-element (102) and the trailing tapered side wall (110B) is inclined at a trailing angle "φ" to the longitudinal axis of the dividing-element (102) such that the leading angle "θ" is less than the trailing angle "φ".

Moreover, the leading tapered side wall (108B), the first operative horizontal surface (112B), the first curved surface (114B), the second curved surface (116B), the second operative horizontal surface (118B), the trailing tapered side wall (110B), forms a continuous asymmetrical structure (104B).

Also, the inception (X2) of one of the leading tapered side wall (108B) is closer to one of the extremities of the dividing element (102) and the inception (Y2) of one of the trailing tapered side wall (110B) is distant to one of the extremities of the dividing element (102) such that the distance of the inception point (Y2) is twice the distance of the inception point (X2) from one of the extremities (E2) on the dividing-element (102).

Further, the asymmetrical structures (104A and 104B) of the system 100 may be securely attached or removably attached to the dividing-element (102). The dividing-element (102) and the asymmetrical structures (104A and 104B) may be made up of any material selected from masonry, clay, plastic, wood, metal, and fibrous material and the asymmetrical structures (104A and 104B) has a shape chosen from a group consisting of an irregular hairpin and irregular dumbbell.

Furthermore, the dividing-element (102) and the asymmetrical structures (104A and 104B) are inflatable made of any elastic material and the dividing-element (102) and the asymmetrical structures (104A and 104B) are inflated with one or more fluids and mixtures thereof.

In accordance with FIG. 2 and FIG. 3 of the present disclosure, several parameters with respect to the components of the system (100) are mentioned herein below:

the length of the leading tapered side walls (108A and 108B) is "$l_1$";
the length of the first operative horizontal surfaces (112A and 112B) is "$a_1$";
the length of the second operative horizontal surfaces (118A and 118B) is "$a_2$";
the length of the first operative horizontal surfaces (112A and 112B) is "$a_1$", wherein in one of the embodiment, the length of the first operative horizontal surfaces (112A and 112B) "$a_1$" can be 0;
the length of the second operative horizontal surfaces (118A and 118B) is "$a_2$", wherein in one of the embodiment, the length of the second operative horizontal surfaces (118A and 118B) "$a_2$" may be o;
in one of the embodiment of the system both, "$a_1$" and "$a_2$" may be 0;
the length of the trailing tapered side walls (110A and 110B) is "$l_2$";
the radius of curvature of the first curved formations (114A and 114B) is "$R_1$";
the radius of curvature of the second curved formations (116A and 116B) is "$R_2$"; and
the distance between the dividing-element (102) and side portions of the boundary wall (106) is "$R_0$".

The arrangement of the asymmetrical structures (104A and 104B) at the extremities of the dividing-element (102) is such that the length of the leading tapered side walls (108A and 108B) "$l_1$" is less than the length of the trailing tapered side walls (110A and 110B) "$l_2$", the length of the first operative horizontal surfaces (112A and 112B) "$a_1$" is less than the length of the second operative horizontal surfaces (118A and 118B) "$a_2$", the radius of curvature of the first curved formations (114A and 114B) "$R_1$" is less than the radius of curvature of the second curved formations (116A and 116B) is "$R_2$".

In accordance with the embodiment of the present disclosure, dimensional relation between "$R_1$", "$R_2$", and "$R_0$" is as follows:

$$R_1 = R_0/4; \text{ and}$$

$$R_2 = R_0/2.$$

Figure 4:
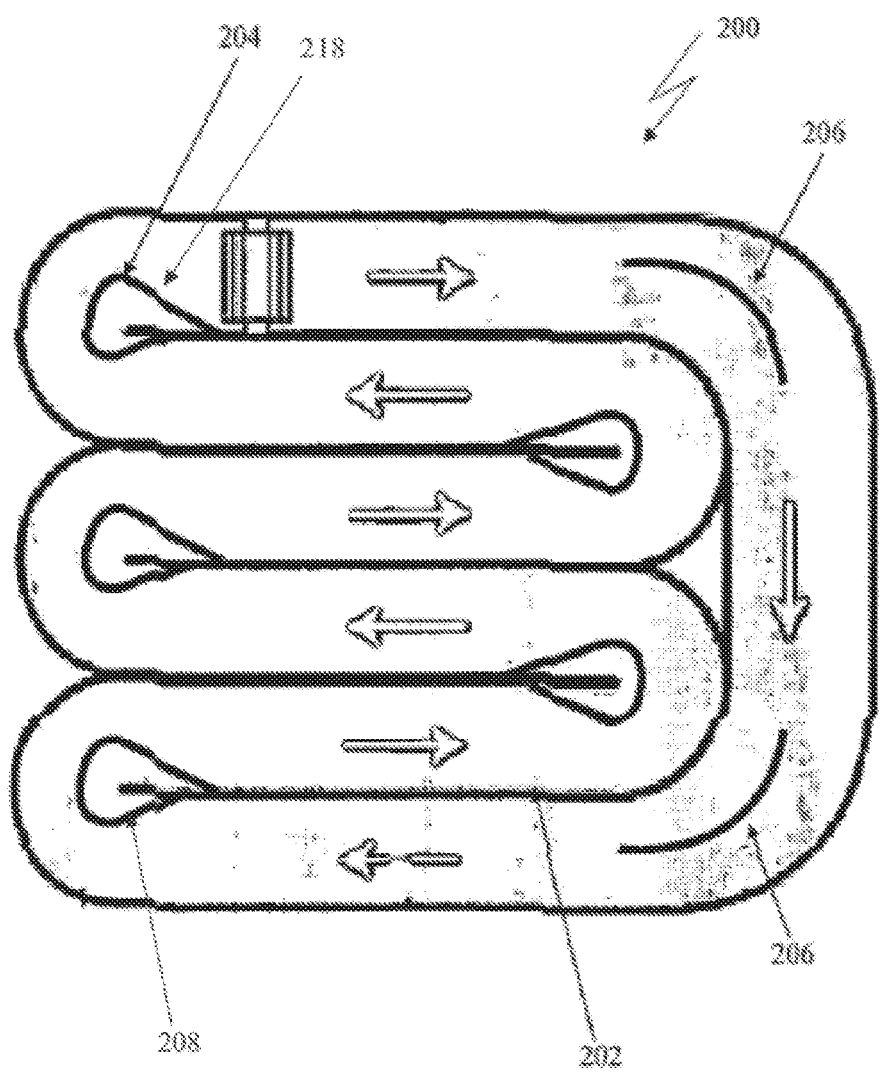
FIG. 4 illustrates a schematic top view of segments of the system in series with one another.

According to another embodiment of the present disclosure, FIG. 4 illustrates the system (200) in which at least one dividing-element (202) disposed within the fluid-body, wherein, the dividing-elements (202) divides the fluid-body into at least two segments such that the segments are connected to and in fluid communication with each other.

Further, the fluid circulation in at least two segments is from first segment to last segment and from last segment to first segment through intermediate segments and configuration and flow of the fluid in the fluid body.

Furthermore, the fluid circulation in the fluid body is such that it first comes in contact with at least one of the trailing tapered side wall (218) and then it comes in contact with at least one leading tapered side wall (208) forming an asymmetric fluid profile due to asymmetric structures (204). A plurality of baffles 206 may be provided at each arcuate bend of the system (200).

The system (100) and (200) with improved flow of fluid ensures the complete elimination of the dead zones and velocity stratification around the dividing-element (102) and (202), thereby enhancing energy efficiency of the system (100) and (200), and reducing the power consumption of the pumping mechanism (120) without compromising on the area for the fluid flow.

Figure 5:
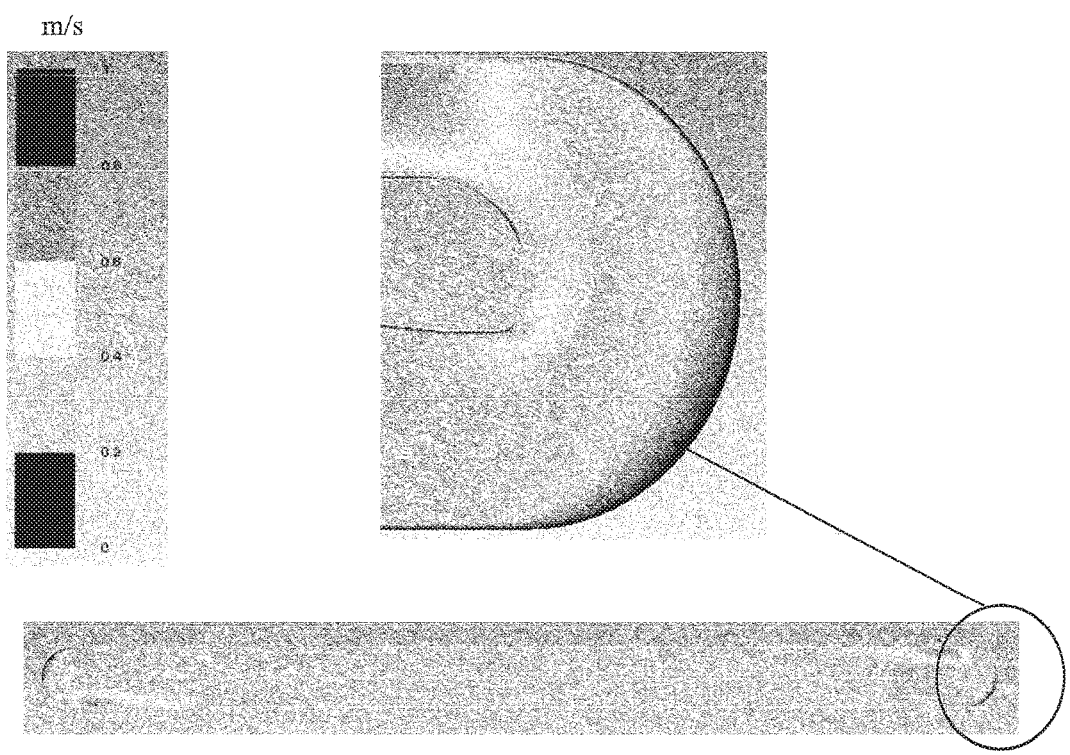
FIG. 5 illustrates a simulated velocity profile for the system in accordance with the present disclosure.

FIG. 5 shows the result of the simulated velocity profile of the system (100). According to FIG. 5, the system (100) has minimal dead zones around the dividing-element (102). Further, during the operation, it was observed that the system (100) has no velocity stratification around the dividing-element (102). The results as per FIG. 5, indicates that the change in flow direction occurs smoothly at both the extremities of the dividing-element (102) with no dead zones near and around the dividing-element (102).

Figure 6A:
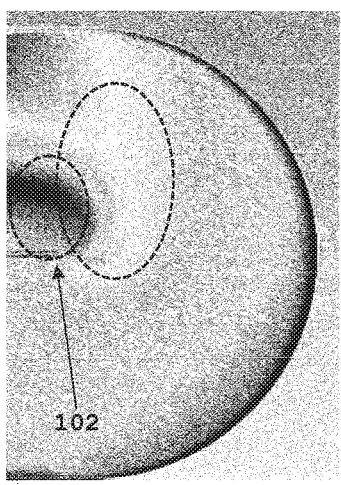
FIG. 6A illustrates a simulated velocity profile for the system with no asymmetrical structures at the extremities of a dividing-element.
Figure 6B:
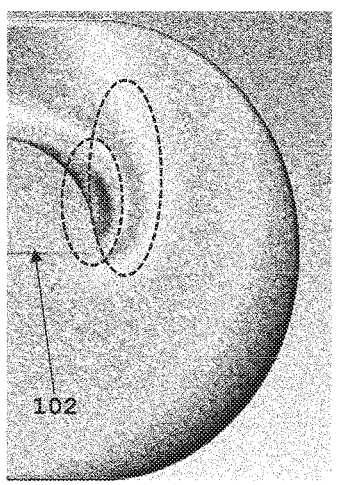
FIG. 6B illustrates a simulated velocity profile for the system with symmetrical structures at the extremities of a dividing-element.
Figure 6C:
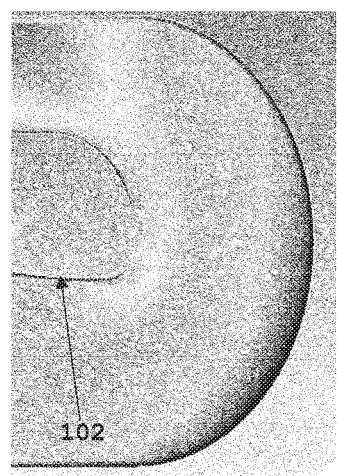
FIG. 6C illustrates a simulated velocity profile for the system in accordance with the present disclosure.

FIG. 6A, FIG. 6B, FIG. 6C illustrates the simulated velocity profile with no structures at the extremities of the dividing-element (100) of the system 100 and with the symmetrical structures (104A and 104B) at the extremities of the dividing-element (102).

According to FIG. 6A, FIG. 6B, FIG. 6C, the system (100) has minimal velocity stratification, minimal pressure drop at the extremities of the dividing-element (102) and minimal energy loss of the fluid.

The different embodiments of the system of the present disclosure described herein above shows that it overcomes all the problems faced during the operation of the conventional system.

Technical Advancement

The technical advancements of a system for improving fluid circulation in a fluid-body of the present disclosure are as follows:

a system provided with minimized dead zones and velocity stratification around a bend region of the system;
a system that eliminates local recirculation of the fluid flowing within the system and prohibiting flow separation;
a system provided with minimal energy losses associated with the fluid flow at the bends within the system;
a system that minimizes power requirement for paddle operation;
a system which minimizes loss of operational area; and
a system that will improve the hydrodynamic behavior.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

The invention claimed is:

1. A system for improving fluid circulation in a fluid-body, said system comprising,
    at least one dividing-element disposed within said fluid-body, wherein, said dividing-elements divides said fluid-body into at least two segments such that said segments are connected to and in fluid communication with each other, characterized in that, at least one of said dividing-element has at least one asymmetrical structure configured on at least one extremity thereof, wherein said asymmetrical structure comprising:
    a leading tapered side wall connected to a first operative horizontal surface parallel to said dividing-element;
    a first curved surface forming an extension of said first operative horizontal surface;
    a second curved surface forming an extension of said first curved surface and connected to said second operative horizontal surface parallel to said dividing-element;
    a trailing tapered side wall is an extension of said second operative horizontal surface and said trailing tapered side walls is connected to said dividing element and wherein the leading tapered side wall and the trailing tapered side wall produces asymmetry on both sides of said dividing element.

2. The system as claimed in claim 1,
    wherein said leading tapered side wall, said first operative horizontal surface, said first curved surface, said second curved surface, said second operative horizontal surface, said trailing tapered side wall, forms a continuous asymmetrical structure.

3. The system as claimed in claim 1, wherein said leading tapered side wall is inclined at a leading angle "θ" to a longitudinal axis of said dividing-element and said trailing tapered side wall is inclined at a trailing angle "φ" to said longitudinal axis of said dividing-element.

4. The system as claimed in claim 3, wherein said leading angle "0" is less than said trailing angle "φ".

5. The system as claimed in claim 1, wherein the inception of said leading tapered side wall is closer to one of the extremities of said dividing element.

6. The system as claimed in claim 5, wherein the inception points of said leading tapered side wall and said trailing tapered side wall are different or not coincident.

7. The system as claimed in claim 1, wherein the inception of said trailing tapered side wall is distant to one of the extremities of said dividing-element.

8. The system as claimed in claim 1, wherein said fluid-body is a water-body.

9. The system as claimed in claim 8, wherein said water-body is a pond.

10. The system as claimed in claim 1, wherein said dividing-element has a structure that is at least one structure chosen from a group consisting of: a hollow structure, a solid structure, a hollow structure filled with a fluid, a perforated solid structure, a perforated hollow structure, a semi-solid structure and a combination thereof.

11. The system as claimed in claim 1, wherein said dividing-element is made up materials chosen from a group consisting of masonry, clay, plastic, wood, metal and fibrous material.

12. The system as claimed in claim 1, wherein said asymmetrical structure is secured at one of the extremities of said dividing-element.

13. The system claimed in claim 1, wherein said asymmetrical structure is removably attached at one of the extremities of said dividing-element.

14. The system as claimed in claim 1, wherein said asymmetrical structure has a shape chosen from a group consisting of an irregular hairpin and irregular dumbbell.

15. The system as claimed in claim 1, wherein said dividing-element and said asymmetrical structures are inflatable and are made of an elastic material.

16. The system as claimed in claim 1, wherein a pumping mechanism is provided in said fluid body that creates at least one of, clockwise circulation and anticlockwise circulation within segments of said fluid-body.

17. The system as claimed in claim 16, wherein the fluid circulation within said at least two segments is from first segment to last segment and from last segment to first segment through intermediate segments.

18. The system as claimed in claim 17, wherein configuration and flow of the fluid in said fluid body is such that it first comes in contact with said leading tapered side wall and then it comes in contact with said trailing tapered side wall forming an asymmetric fluid profile.

19. The system as claimed in claim 16, wherein said pumping mechanism for circulating the fluid within said fluid-body is at least one like a paddle wheel, a propeller, a linear jet.

* * * * *